(12) United States Patent
Hirai

(10) Patent No.: US 9,507,163 B2
(45) Date of Patent: Nov. 29, 2016

(54) EXTERIOR MEMBER AND VEHICLE INCORPORATING THE SAME

(71) Applicant: HONDA MOTOR CO., LTD., Tokyo (JP)

(72) Inventor: Mitsuru Hirai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/819,838

(22) Filed: Aug. 6, 2015

(65) Prior Publication Data
US 2016/0039362 A1    Feb. 11, 2016

(30) Foreign Application Priority Data

Aug. 7, 2014   (JP) ................. 2014-161593

(51) Int. Cl.

| G02B 27/10 | (2006.01) |
|---|---|
| B60J 9/00 | (2006.01) |
| G02B 27/22 | (2006.01) |
| B44F 1/06 | (2006.01) |
| B44F 1/00 | (2006.01) |
| B60Q 1/00 | (2006.01) |
| B60R 13/04 | (2006.01) |
| F16B 5/00 | (2006.01) |

(52) U.S. Cl.
CPC ............. *G02B 27/2214* (2013.01); *B44F 1/00* (2013.01); *B44F 1/06* (2013.01); *B60Q 1/00* (2013.01); *B60R 13/04* (2013.01); *B44F 1/066* (2013.01); *F16B 5/00* (2013.01); *F16B 5/0004* (2013.01)

(58) Field of Classification Search
CPC .. G02B 27/00; G02B 27/10; G02B 27/2214; F16B 5/00; F16B 5/0004; F16B 5/12; B60R 13/04; B60R 13/06; B60Q 1/00; B44F 1/00; B44F 1/06; B44F 1/066; B62C 1/00
USPC ........ 359/245, 315, 316, 319, 619; 296/1.01, 296/1.07, 1.08
See application file for complete search history.

(56) References Cited

FOREIGN PATENT DOCUMENTS

JP      2002-067701 A      3/2002

*Primary Examiner* — Loha Ben
(74) *Attorney, Agent, or Firm* — Westerman, Hattori, Daniels & Adrian, LLP

(57) ABSTRACT

A vehicle includes a transparent panel provided on an external surface of the vehicle and spaced from an internal component part disposed at a vehicle inner side and an exterior member at least one of whose end portions is adjacent to the transparent panel and which is disposed on the external surface so as to be substantially parallel to the transparent panel. The exterior member includes a light transmissive layer located at a vehicle outer side and a print layer that is located at the vehicle inner side of the light transmissive layer and in contact with the light transmissive layer and that includes a printed pixel pattern in which pixels are two-dimensionally arranged. The print layer is printed such that when the exterior member is viewed from outside the vehicle, a virtual image of the pixel pattern appears on the vehicle inner side of the print layer.

9 Claims, 7 Drawing Sheets

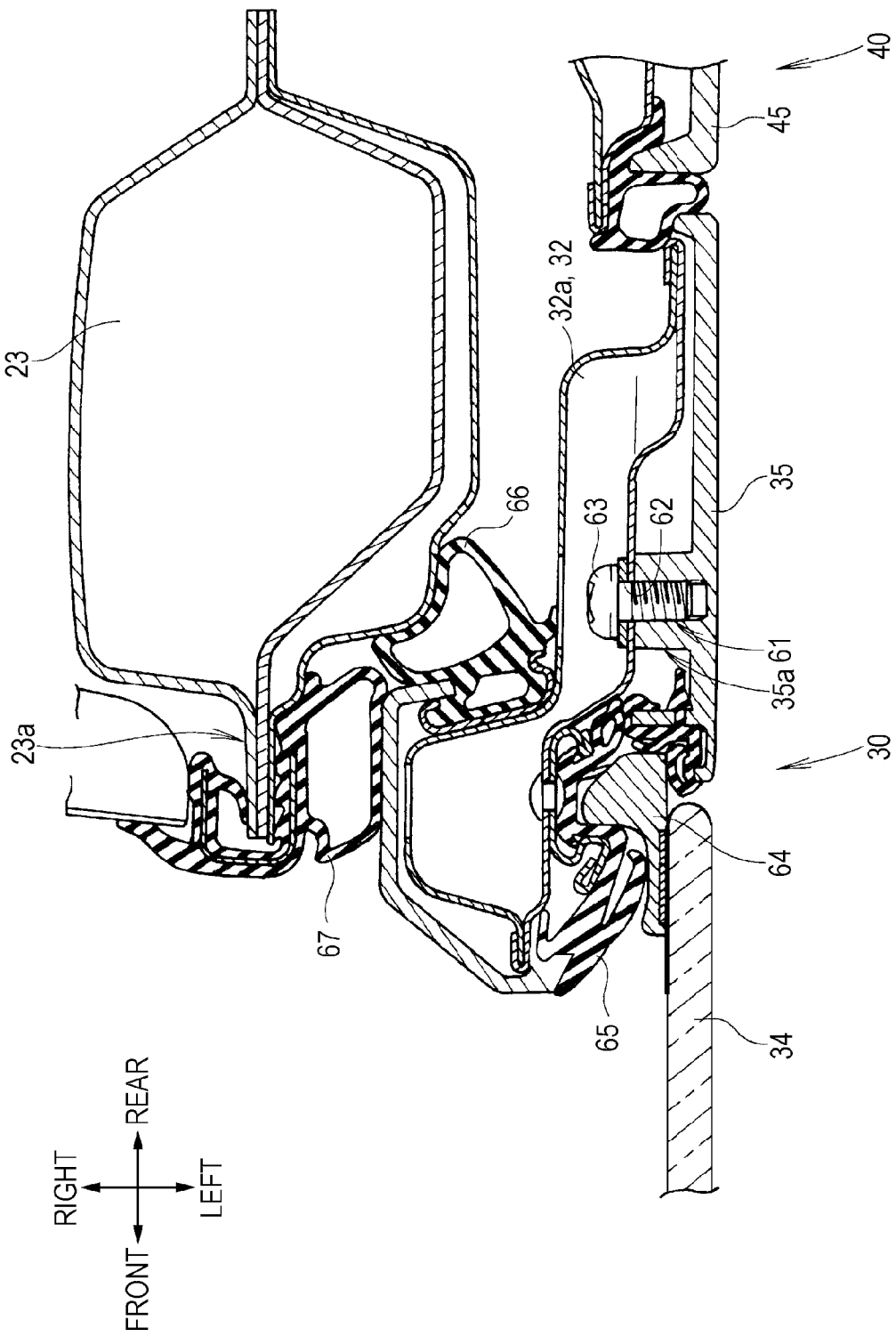

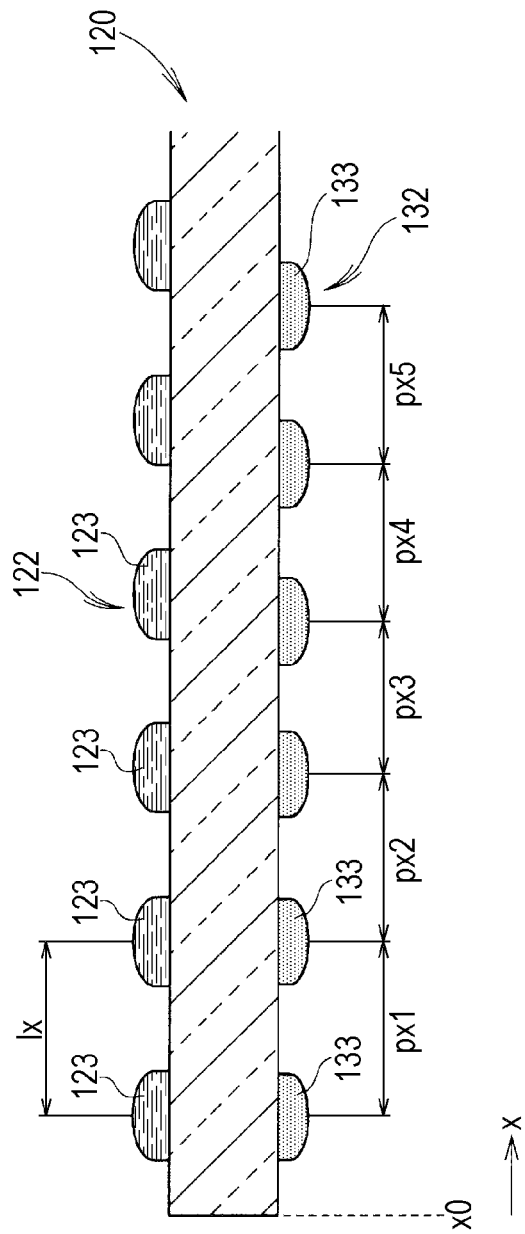
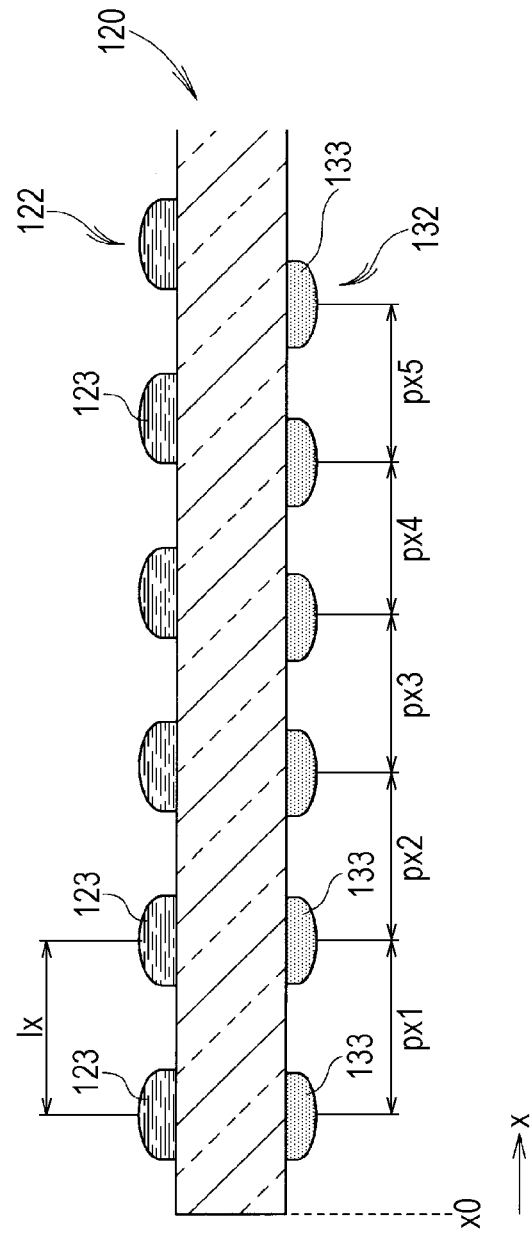
FIG. 5A
FIG. 5B

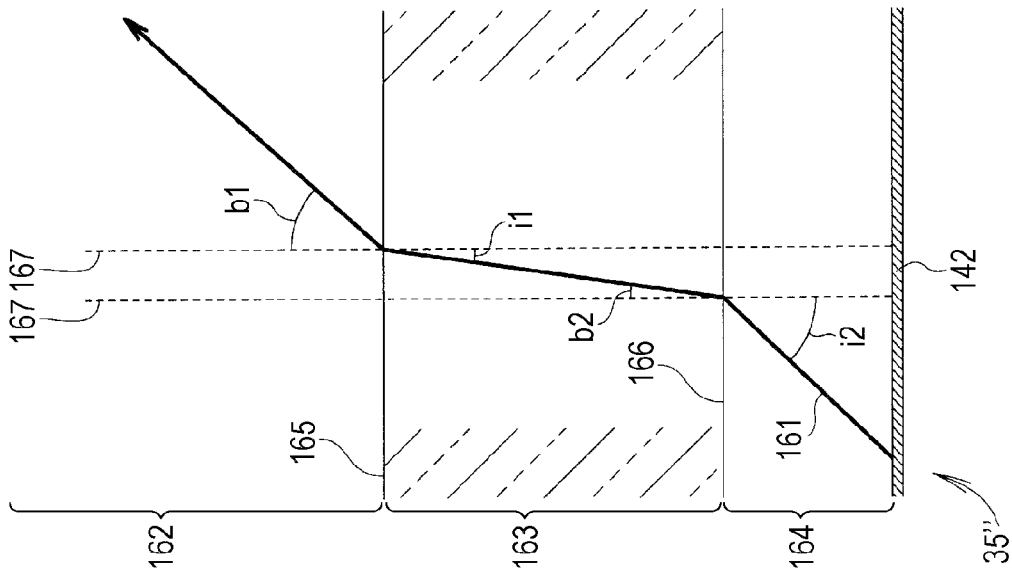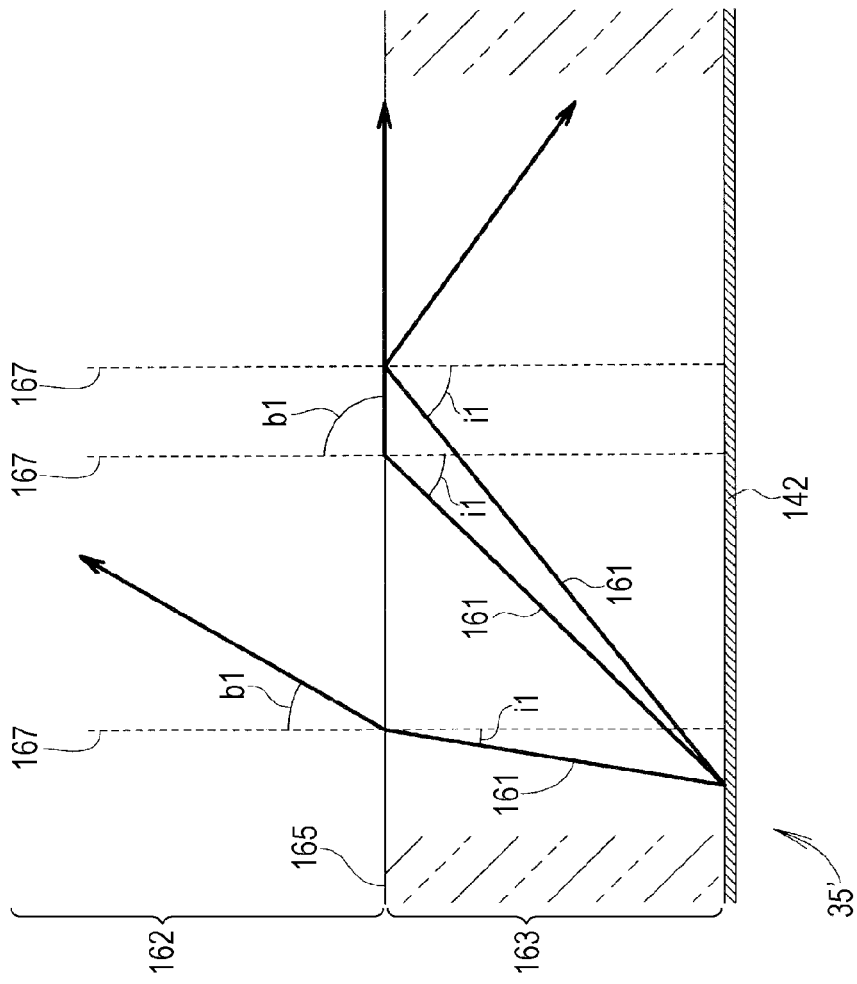

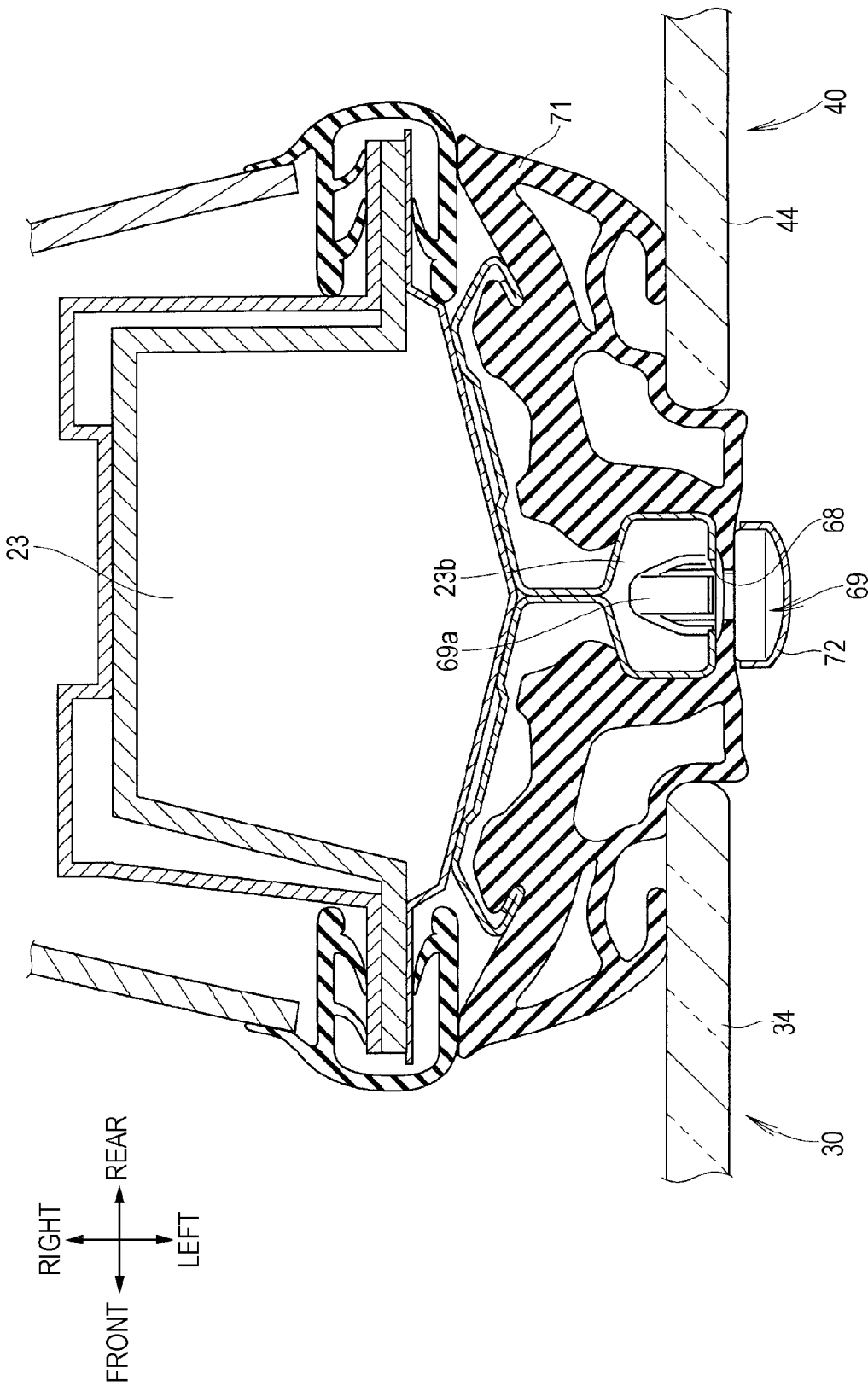

EXTERIOR MEMBER AND VEHICLE INCORPORATING THE SAME

CROSS REFERENCES TO RELATED APPLICATIONS

The present application claims priority under 35 U.S.C. §119 to Japanese Patent Application No. 2014-161593, filed Aug. 7, 2014, entitled "EXTERIOR MEMBER AND VEHICLE INCORPORATING THE SAME." The contents of this application are incorporated herein by reference in their entirety.

BACKGROUND

1. Field

The present disclosure relates to a vehicle that includes an exterior member that, when viewed from outside the vehicle, looks united or integrated with an adjacent window panel and also relates to the exterior member.

2. Description of the Related Art

A vehicle whose front door includes a front center garnish (exterior member) adjacent to a front window panel and whose rear door includes a rear center garnish (exterior member) adjacent to a rear window panel is described in, for example, Japanese Unexamined Patent Application Publication No. 2002-67701, the entire contents of which are incorporated herein by reference. Generally, such a garnish is formed from a material that does not transmit light, such as a spun-dyed black resin member. Therefore, as for the vehicle illustrated in the foregoing patent application publication, since the front center garnish and the rear center garnish do not transmit light, the center pillars, the sliders of the window panels, and the like are less visible from outside the vehicle, so that design characteristics of the vehicle can be increased.

Generally, the surface of a window panel is smoother than the surface of a garnish, so that if the transmission of light coming from inside through the window panel is low, the window panel reflects an outside scene like a mirror. On the other hand, the surface of the garnish is rougher than the surface of the window panel, and diffusely reflects light, so that continuity of the outside scene reflected in the window panel cannot be maintained and therefore a sense of unity cannot be obtained. Improvement in conjunction with the foregoing problem could be made by mirror-finishing the surface of a garnish to a smooth surface that is comparable to the surface of the window panel. However, despite this improvement, it is still difficult to obtain a sense of unity because the spun-dyed resin garnish and the transparent window panel are completely different in hue. Thus, in order to obtain a sense of unity between the window panel and the garnish, there still is a room for improvement.

A conceivable method for obtaining a sense of unity between a window panel and a garnish is, for example, a method in which the hue of the surface of a garnish is made closer to the hue of a window panel by providing a mirror-finished light transmissive layer made of a transparent resin or the like on a vehicle outer-side surface of the garnish and printing (painting) the rear surface of the garnish in black to screen a structural body from view, which is an original purpose of the garnish.

However, in this structure, when the garnish is viewed from an angle close to a parallel to the surface of the garnish, light that travels from the vehicle inner side to the vehicle outer side is totally reflected at a boundary between the light transmissive layer of the garnish and air outside the vehicle. As a result, the base material of the garnish is not visible behind the light transmissive layer but the surface of the garnish appears black, so that the perceivable hue is not the hue of the light transmissive layer but the hue of the blinder. Therefore, it is difficult to obtain a sense of unity between the garnish and the window panel. As a structure that solves the foregoing problem, it is conceivable to separate the light transmissive layer and the blinder from each other by a distance equal to the distance between the window panel or the like and a cabin interior component or material (e.g., a seat, a pillar garnish, etc.) that is visible through the window panel. However, this solution is likely to result in a reduced cabin space due to an excessively great thickness of the garnish.

SUMMARY

The present application describes a vehicle that includes an exterior member that, when viewed from outside the vehicle, looks united with an adjacent transparent panel and also describes the exterior member. Other features and the like of the present application will become apparent to a person skilled in the art by referring to the following exemplary embodiments and the like and the accompanying drawings.

According to a first aspect of the present disclosure, a vehicle includes a transparent panel that is provided on an external surface of the vehicle (such as an outermost exterior surface of the vehicle side body) and that is spaced from an internal component part that is disposed at a vehicle inner side, and an exterior member at least one of whose end portions is adjacent to the transparent panel and which is disposed on the external surface of the vehicle so as to be substantially parallel to the transparent panel. The exterior member includes a light transmissive layer located at a vehicle outer side relative to the vehicle, and an image-printed layer that is located at the vehicle inner side of the light transmissive layer and that is in contact with the light transmissive layer. The image-printed layer includes an image portion (i.e., a printed-image layer) in which a pixel pattern in which a plurality of pixels is two-dimensionally arranged is printed, and a light transmissive and light condenser portion which is located between the light transmissive layer and the image portion and in which a light condenser element pattern in which a plurality of light condenser elements are two-dimensionally arranged is printed. The pixel pattern and the light condenser element pattern of the image-printed layer are printed such that when the exterior member is viewed from outside the vehicle, a virtual image of the pixel pattern appears on the vehicle inner side of the image-printed layer.

When the exterior member is viewed from outside the vehicle, due to the geometric relationship of the above patterns, the virtual image of the pixel pattern appears sunk in depth, i.e., at a location deeper than the actual location of the pixel pattern so that the thickness of the light transmissive layer looks greater than the actual thickness of the light transmissive layer. Therefore, since the exterior member is disposed so as to be adjacent to the transparent panel, how the pixel pattern of the exterior member viewed from outside the vehicle looks becomes close to how internal component parts viewed from outside the vehicle through the transparent panel look. As a result, the transparent panel and the exterior member look united, and therefore a sense of unity between the transparent panel and the exterior member is obtained, so that design characteristics improve. Furthermore, since there is no need to provide a space for obtaining a depth appearance at the reverse side (cabin side) of the light transmissive layer, a reduction of the cabin space and an increased feeling of tightness can be prevented and the exterior member can be reduced in weight and production cost. Furthermore, since the optical refractive indexes of the base material that constitutes the image-printed layer and the ink or paste that forms the plurality of light condenser elements can be made lower than the optical refractive index of the light transmissive layer, occurrence of the total reflection of light at the boundary between the light transmissive layer and air outside the vehicle is restrained. As a result, even when the exterior member is viewed particularly from an angle other than angles close or equal to the right angle to the surface of the exterior member, a sense of unity between the exterior member and the transparent panel is obtained, so that design characteristics improve.

According to a second aspect of the present disclosure, the transparent panel in the first aspect may be a transparent window panel that covers a window opening portion that is provided on the vehicle.

When the exterior member is viewed from outside the vehicle, the virtual image of the pixel pattern appears sunk in depth, so that the thickness of the light transmissive layer looks greater than the actual thickness of the light transmissive layer. Therefore, since the exterior member is disposed so as to be adjacent to the transparent panel, how the pixel pattern of the exterior member viewed from outside the vehicle looks is close to how internal component parts viewed from outside the vehicle through the transparent panel look. As a result, the transparent panel and the exterior member look united, and therefore a sense of unity between the transparent panel and the exterior member is obtained, so that design characteristics improve. Furthermore, since there is no need to provide a space for obtaining a depth appearance at the reverse side (cabin side) of the light transmissive layer, a reduction of the cabin space and an increased feeling of tightness can be prevented and the exterior member can be reduced in weight and production cost. Furthermore, since the optical refractive indexes of the base material that constitutes the image-printed layer and the ink or paste that forms the plurality of light condenser elements can be made lower than the optical refractive index of the light transmissive layer, occurrence of the total reflection of light at the boundary between the light transmissive layer and air outside the vehicle is restrained. As a result, even when the exterior member is viewed particularly from an angle other than angles close or equal to the right angle to the surface of the exterior member, a sense of unity between the exterior member and the transparent panel is obtained, so that design characteristics improve.

According to a third aspect of the present disclosure, the window panel in the second aspect may be movably provided on the vehicle, an edge portion of the window panel which is adjacent to the exterior member may be sealed by a seal member, and a color of the pixel pattern may be similar to a color of the seal member.

When the vehicle is viewed from outside the vehicle, the color of the pixel pattern being similar to the color of the seal member increases the sense of unity between the exterior member and the window panel.

According to a fourth aspect of the present disclosure, the image-printed layer in the third aspect may be printed such that when the exterior member is viewed from outside the vehicle, the virtual image appears at a depth substantially the same as a depth at which the seal member is provided.

When the exterior member is viewed from outside the vehicle, the virtual image of the pixel pattern appears at substantially the same depth as the depth at which the seal member is provided, so that the sense of unity between the exterior member and the window panel further increases.

According to a fifth aspect of the present disclosure, of end portions of the exterior member in any one of the first aspect to fourth aspect, at least an end portion opposite to one end portion adjacent to the transparent panel may be adjacent to the external surface of the vehicle, and the image-printed layer may be printed such that when the exterior member is viewed from outside the vehicle, a depth at which the virtual image appears becomes shallower from the one end portion toward the end portion opposite to the one end portion.

When the exterior member is viewed from outside the vehicle, the depth at which the virtual image of the pixel pattern appears becomes shallower from the end portion of the pixel pattern adjacent to the transparent panel toward the opposite end portion, so that the exterior member and the transparent panel look as if they were a single transparent panel. Therefore, the sense of unity between the exterior member, the transparent panel, and the external surface of the vehicle increases.

According to a sixth aspect of the present disclosure, the vehicle in any one of the second aspect to fourth aspect may further include a front door and a rear door each of which closes and opens a door opening portion provided in a side surface of the vehicle body, each of the front door and the rear door may be provided with the window opening portion, each window opening portion may be covered by the window panel, and the exterior member may be disposed between the window panel of the front door and the window panel of the rear door.

When a side portion of the vehicle is viewed from outside the vehicle, how the exterior member viewed from outside the vehicle looks is close to how component parts disposed inside the cabin look in a view from outside the vehicle through the window panel of the front door and the window panel of the rear door. Therefore, design characteristics improve.

According to a seventh aspect of the present disclosure, in the sixth aspect, a depth at which the virtual image appears may be substantially constant when the exterior member disposed between the window panel of the front door and the window panel of the rear door is viewed from outside the vehicle.

When a side portion of the vehicle is viewed from outside the vehicle, an area that includes the window panel of the front door and the window panel of the rear door looks as if the area were made up of a single window panel. Thus, the exterior member is not conspicuous, and the sense of unity between the exterior member, the window panel of the front door, and the window panel of the rear door increases.

According to an eighth aspect of the present disclosure, the light condenser element pattern in any one of the first aspect to seventh aspect may be printed such that a two-dimensional arrangement interval of the plurality of light condenser elements is larger than a two-dimensional arrangement interval of the plurality of pixels in the pixel pattern.

When the image-printed layer is viewed from a plane that is in contact with the light transmissive layer, a virtual image of the pixel pattern through the light condenser element pattern appears. At this time, the virtual image of the pixel pattern that the right eye sees through the light condenser element pattern and the virtual image of the pixel pattern that the left eye sees through the light condenser element pattern make a parallax. When the two-dimensional arrangement intervals of the light condenser elements are larger than the two-dimensional arrangement intervals of the pixels in the pixel pattern, the parallax between the virtual image that the right eye sees and the virtual image that the left eye sees causes the brain to recognize that the pixel pattern is located at a depth that is greater than the depth at which the pixel pattern is actually located.

According to a ninth aspect of the present disclosure, an exterior member for a vehicle which is disposed on an external surface of the vehicle such that at least one end portion of the exterior member is adjacent to a transparent panel that is provided on the external surface of the vehicle and that is spaced from an internal component part that is disposed at a vehicle inner side and such that the exterior member is substantially parallel to the transparent panel. The exterior member includes a light transmissive layer located at a vehicle outer side relative to the vehicle and a image-printed layer that is located at the vehicle inner side of the light transmissive layer and that is in contact with the light transmissive layer. The image-printed layer includes an image portion in which a pixel pattern in which a plurality of pixels is two-dimensionally arranged is printed and a light condenser portion which is located between the light transmissive layer and the image portion and in which a light condenser element pattern in which a plurality of light condenser elements are two-dimensionally arranged is printed. The pixel pattern and the light condenser element pattern of the image-printed layer are printed such that when the exterior member is viewed from outside the vehicle, a virtual image of the pixel pattern appears on the vehicle inner side of the image-printed layer.

Since the pixel pattern is printed in the image-printed layer so as to appear sunk to a greater depth side, the depth of the light transmissive layer looks greater than the actual thickness of the light transmissive layer when the exterior member is viewed from outside the vehicle. Therefore, since the exterior member is disposed so as to be adjacent to the transparent panel, how the pixel pattern of the exterior member viewed from outside the vehicle looks is close to how internal component parts viewed from outside the vehicle through the transparent panel look, so that design characteristics improve. Because the thickness of the light transmissive layer can be made less than the thickness of the transparent panel, the weight and the production cost of the exterior member can be reduced. Furthermore, since the optical refractive index of the light condenser element pattern of the image-printed layer can be made lower than the optical refractive index of the light transmissive layer, occurrence of the total reflection of light at the boundary between the light transmissive layer and air outside the vehicle is prevented. As a result, even when the exterior member is viewed particularly from an angle other than angles close or equal to the right angle to the surface of the exterior member, a sense of unity between the exterior member and the transparent panel is obtained, so that design characteristics improve.

BRIEF DESCRIPTION OF THE DRAWINGS

FIG. 2 is a sectional view taken on line II-II of FIG. 1.

FIGS. 5A and 5B are each a diagram showing an example of arrangements in an x direction of a light condenser element pattern and a pixel pattern shown in FIG. 4.

FIGS. 6A and 6B are diagrams illustrating how light travels from a vehicle inner side to a vehicle outer side in an exterior member.

FIG. 7 is a diagram showing a modification of the center pillar and its surrounding shown in FIG. 2.

DESCRIPTION OF THE PREFERRED EMBODIMENTS

Preferred embodiments described below are used in order to facilitate the understanding of the present disclosure. Therefore, a person skilled in the art should note that the present disclosure is not unjustly limited by the embodiments described below.

In the embodiments described below, "front", "rear", "left" "right", "up" and "down regarding a vehicle are directions from the viewpoint of a driver inside the vehicle. Note that left and right constructions of the vehicle that are substantially the same will be described only with regard to the left-side constructions, and descriptions of the right-side constructions will be omitted.

Figure 1:
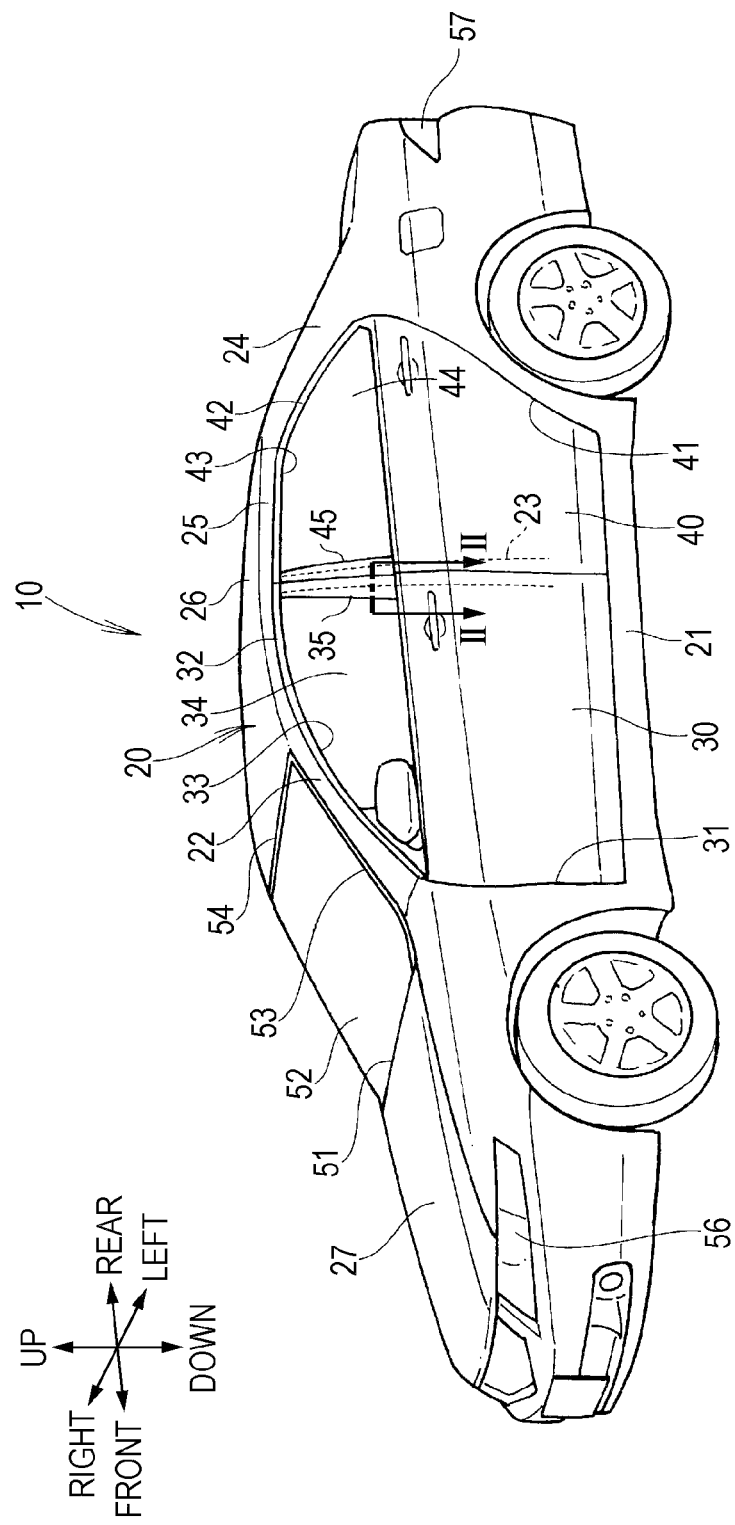
FIG. 1 is a perspective view showing an example of a vehicle according to the present disclosure.

As shown in FIG. 1, a vehicle 10 is, for example, a four-door type passenger motor vehicle. A vehicle body 20 of the vehicle 10 includes left and right side sills 21 extending in front-to-rear directions of the vehicle body, left and right front pillars 22 standing from front portions of the side sills 21, left and right center pillars 23 standing from longitudinal central portions of the left and right side sills 21, left and right rear pillars 24 standing from rear portions of the left and right side sills 21, left and right roof rails 25 connecting upper portions of the left and right front pillars 22 and upper portions of the left and right rear pillars 24, and a roof panel 26 extending between the left and right roof rails 25.

Left and right side portions of the vehicle body 20 are each provided with a front door opening portion 31 that is surrounded by the side sill 21, the front pillar 22, the center pillar 23, and the roof rail 25. Furthermore, each of the left and right side portions of the vehicle body 20 is provided with a rear door opening portion 41 surrounded by the side sill 21, the center pillar 23, the rear pillar 24, and the roof rail 25.

Each front door opening portion 31 is opened and closed by a front door 30. The front door 30 is supported by a hinge (not shown in the drawings) on the front pillar 22 so that the front door 30 can be opened and closed. The front door 30 is made up of a lower-side door body and a front sash 32 provided on top of the door body. Furthermore, the front door 30 is provided with a front door window opening portion 33 that is surrounded by the door body and the front sash 32. The front door window opening portion 33 is provided with a front door window panel 34 that is a transparent panel that covers the front door window opening portion 33. The front door window panel 34 is guided by the front sash 32 so that the front door window panel 34 can be raised and lowered.

The rear door opening portion 41 is opened and closed by a rear door 40. The rear door 40 is supported by a hinge (not shown in the drawings) on the center pillar 23. The rear door 40 is made up of a lower-side door body and a rear sash 42 provided on top of the door body. Furthermore, the rear door 40 is provided with a rear door window opening portion 43 that is surrounded by the door body and a rear sash 42. The rear door window opening portion 43 is provided with a rear door window panel 44 that is a transparent panel that covers the rear door window opening portion 43. The rear door window panel 44 is guided by the rear sash 42 so that the rear door window panel 44 can be raised and lowered.

Note that although the vehicle body 20 shown in FIG. 1 is provided with the front door opening portions 31 and the rear door opening portions 41, this construction does not may be modified. For example, in a vehicle 10 not provided with the center pillars 23, a door opening portion surrounded by a side sill 21, a front pillar 22, a rear pillar 24, and a roof rail 25 may be formed in each of left and right side portions of the vehicle body 20. In this construction, for example, if the vehicle 10 is a two-door vehicle, this door opening portion on each side may be opened and closed only by a front door 30, and if the vehicle 10 is a four-door vehicle, the door opening portion may also be opened and closed by a front door 30 and a rear door 40. Incidentally, although FIG. 1 shows the front door 30 and the rear door 40 both of which are hinged doors, the front door 30 and/or the rear door 40 may be a sliding door.

A front portion of the vehicle body 20 is provided with a front window opening portion 51 surrounded by the left and right front pillars 22, the hood 27, and the roof panel 26. This front window opening portion 51 is covered with a front window panel 52 that is a transparent panel.

Furthermore, although not shown in the drawings, the vehicle 10 further includes a quarter window panel provided in each of the front doors 30 and/or the rear doors 40, a rear window panel provided in a rear portion of the vehicle body 20, a window panel provided in a sun roof, etc. Incidentally, the quarter window panels, the rear window panel, the sun roof window panel, etc., are transparent panels.

The aforementioned window panels (that include the window panels 34 and 44 for the front and rear doors 30 and 40) that are transparent panel are transparent. Note that transparency herein is a concept that includes colorless transparency, colorless semitransparency, colored transparency, and colored semitransparency. Furthermore, each window panel may be made of glass or may also be made of resin, and is a member whose surface is smoother than an external surface of the vehicle 10.

Each front door 30 includes a front center garnish 35 as an exterior member that covers an outer surface of the center pillar 23 in a vehicle transverse direction. A front end portion of the front center garnish 35 is adjacent to a rear end portion of the front door window panel 34 and extends in vehicle body up-down directions so as to be substantially parallel to the front door window panel 34. Each rear door 40 includes a rear center garnish 45 as an exterior member that covers an outer surface of the center pillar 23 in the vehicle transverse direction. A rear end portion of the rear center garnish 45 is adjacent to a front-side end portion of the rear door window panel 44 and extends in the vehicle body up-down directions so as to be substantially parallel to the rear door window panel 44.

A lower end portion of the front center garnish 35 is adjacent to an external surface of a door body of the front door 30. A lower end portion of the rear center garnish 45 is adjacent to an external surface of a door body of the rear door 40. The front center garnish 35 and the rear center garnish 45 are disposed between the front door window panel 34 and the rear door window panel 44. Incidentally, the lower end portion of the front center garnish 35 may be adjacent to the external surface of the door body of the front door 30 via, for example, a molding (not shown in the drawings) or the like. Similarly, the lower end portion of the rear center garnish 45 may be adjacent to the external surface of the door body of the rear door 40 via, for example, a molding (not shown in the drawings) or the like.

An upper end portion of the front center garnish 35 is adjacent to the front sash 32. An upper end portion of the rear center garnish 45 is adjacent to the rear sash 42. A rear end portion of the front center garnish 35 is adjacent to a front end portion of the rear center garnish 45.

When the front door 30 is not provided with a front sash 32, the upper end portion of the front center garnish 35 is adjacent to, for example, a lower-side external surface of the roof rail 25. Similarly, when the rear door 40 is not provided with a rear sash 42, the upper end portion of the rear center garnish 45 is adjacent to, for example, a lower-side external surface of the roof rail 25. Incidentally, in that case, the upper end portion of the front center garnish 35 and the upper end portion of the rear center garnish 45 may be adjacent to the lower-side external surface of the roof rail 25 via, for example, a molding (not shown in the drawings) or the like.

A front portion of the vehicle body 20 includes a left front garnish 53, an upper front garnish 54, and a right front garnish (not shown in the drawings) as exterior members. A right end portion of the left front garnish 53 is adjacent to a left end portion of the front window panel 52, and an end portion of the left front garnish 53 other than the right end portion thereof is adjacent to an external surface of the front portion of the vehicle body 20 and is substantially parallel to the front window panel 52. A lower end portion of the upper front garnish 54 is adjacent to an upper end portion of the front window panel 52, and an end portion of the upper front garnish 54 other than the lower end portion thereof is adjacent to an external surface of the front portion of the vehicle body 20 and is substantially parallel to the front window panel 52. The right front garnish is substantially the same as the left front garnish 53, except that the right front garnish is symmetrical to the left front garnish 53.

In conjunction with a left-side headlight 56, a left-side headlight garnish may be provided around a lens portion of the left-side headlight 56 which is a transparent panel disposed with a space from a light source of the left-side headlight 56. Similarly, in conjunction with a left-side rear light 57, a left-side rear light garnish may be provided around a lens portion of the left-side rear light 57 which is a transparent panel disposed with a space left between the lens portion and a light source of the left-side rear light 57.

FIG. 2 illustrates a relationship of the center pillar 23 with the front door 30 and the rear door 40 that are both closed. Only a front door 30-side structure will be described, and a rear door 40-side structure is omitted from the following description since the rear door 40-side structure is substantially the same as the front door 30-side structure. The front door 30 includes a front center sash portion 32*a* of the front sash 32 that extends upward from the door body of the front door 30 and the front door window panel 34 that is capable of being raised and lowered relative to the door body of the front door 30.

The front center garnish 35 is attached to the front center sash portion 32*a* by, for example, aligning a threaded hole 61 formed in a boss 35*a* provided substantially at a center of the front center garnish 35 with a through hole 62 formed in the front center sash portion 32*a* and screwing a bolt 63 into the threaded hole 61 through the through hole 62. Alternatively, for example, in the case where a left side of the front center sash portion 32*a* of the front sash 32 is broad and flat in the front-rear direction, the front center garnish 35 may be stuck to the left side of the front center sash portion 32*a* with an adhesive or the like.

A right side of a rear edge portion of the front door window panel 34 is provided with a slider 64 for raising and lowering the front door window panel 34 relative to the door body of the front door 30. A left side of a front-side portion of the front center sash portion 32a is provided with a run channel 65. The front door window panel 34 is raised and lowered in the vehicle body up-down directions, with the slider 64 guided by the run channel 65. Furthermore, the run channel 65 also performs a function of sealing a gap between the front center sash portion 32a, the front center garnish 35 and the front door window panel 34.

The front door 30 is provided with a weather strip 66 at substantially a center of the front center sash portion 32a of the front sash 32. The weather strip 66 seals a gap between the front door 30 and the center pillar 23. Furthermore, the center pillar 23 is provided with a weather strip 67 on a font edge portion 23a of the center pillar 23. The weather strip 67 seals a gap between the center pillar 23 and the front door 30.

In the description of this embodiment below, the slider 64, the run channel 65, the weather strip 66, and the weather strip 67 will be collectively termed the seal member as well. When the front door window panel 34 is viewed from outside the vehicle, at least a portion of the seal member is visible behind the front door window panel 34.

Hereinafter, exterior members will be described in detail, by referring to the front center garnish 35 as a representative example of the exterior members. The front center garnish 35 will be also termed "exterior member 35" as appropriate. Other exterior members, such as the rear center garnish 45, the left front garnish 53 and the upper front garnish 54, have substantially the same constructions, and descriptions thereof will be omitted.

Figure 3A:
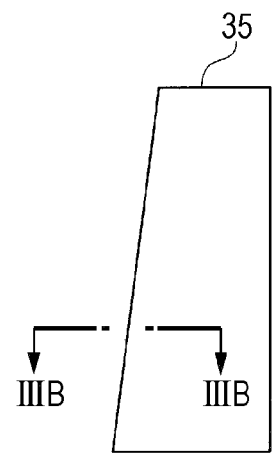
FIGS. 3A and 3B are construction diagrams of an exterior member shown in FIG. 1.
Figure 3B:
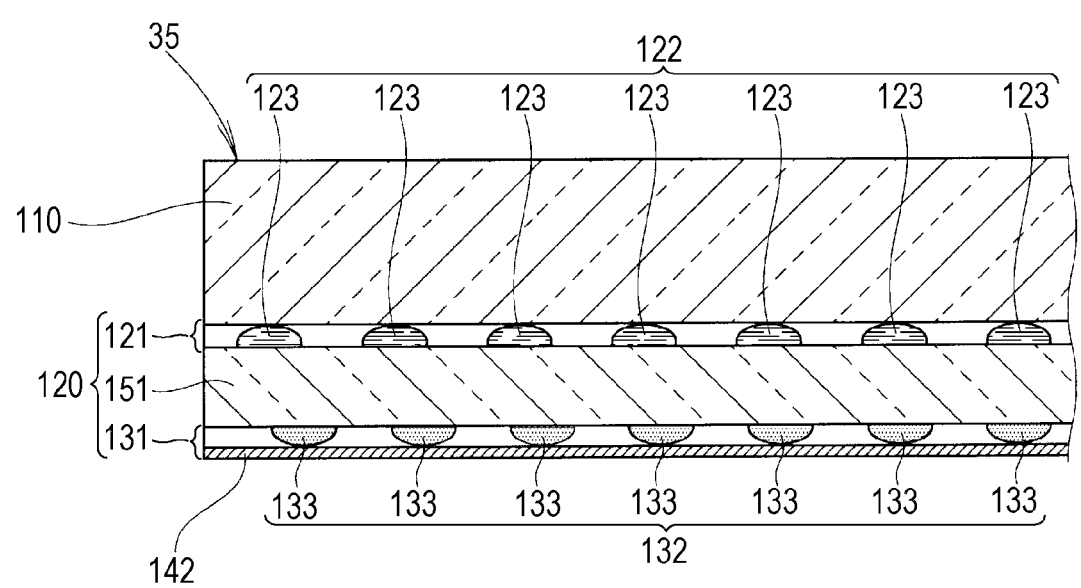

FIG. 3A is a front view of the exterior member 35. FIG. 3B is a sectional view taken on line IIIB-IIIB in FIG. 3A. As shown in FIG. 3B, the exterior member 35 includes a light transmissive layer 110 positioned on a vehicle outer side relative to the vehicle 10 and a image-printed layer 120 that is located on the vehicle inner side of and in contact with the light transmissive layer 110. The light transmissive layer 110 may be formed from a transparent resin that transmits light. The color of the light transmissive layer 110 is preferred to be the same as the color of the front door window panel 34.

The image-printed layer 120 includes, for example, a transparent base material 151 that transmits light, a light condenser portion 121 that is formed on a vehicle outer-side surface of the base material 151 and that is in contact with the light transmissive layer 110, and an image portion 131 formed on a vehicle inner-side surface of the base material 151. A light condenser element pattern 122 in which, for example, a plurality of convex lens-shaped light condenser elements 123 are two-dimensionally arranged, is printed in the light condenser portion 121. The light condenser elements 123 are formed by printing, for example, a transparent ink or paste that has a property of being able to be thickly deposited. In the image portion 131, a pixel pattern 132 in which for example, a plurality of pixels 133 are two-dimensionally arranged, is printed. The pixels 133 are formed by printing, for example, a colored transparent or opaque ink or paste whose color is, for example, similar to the color of the seal members of the vehicle 10 mentioned above. The thickness of the base material 151, that is, the distance between the light condenser elements 123 of the light condenser portion 121 and the pixels 133 of the image portion 131, is preferred to be equal to the focal length of the light condenser element 123. Furthermore, the optical refractive indexes of the base material 151 and the transparent ink or paste that forms the light condenser elements 123 are preferred to be smaller than the optical refractive index of the transparent resin that forms the light transmissive layer 110.

The image portion 131 may further include, for example, a background layer 142 printed to the vehicle inner side of the pixel pattern 132. The background layer 142 is formed, for example, to the vehicle inner side of the pixel pattern 132, by, for example, using a base material colored in a color similar to the color of the pixels 133. Alternatively, the background layer 142 may be formed by printing an opaque ink or paste of a color similar to the color of the pixels 133. Note that it is preferable that the color of the pixels 133 and the color of the background layer 142 be similar to each other and be different from each other in color strength. The greater the difference between the color strength of the pixels 133 and the color strength of the background layer 142, the easier it is to visually recognize the pixel pattern 132. Furthermore, it is preferable that the color strength of the background layer 142 be equal to the color strength of the seal members of the vehicle 10. Usually, the background layer 142 is larger in area than the pixels 133, so that the background layer 142 being equal in color strength to the seal members of the vehicle 10 produces a less sense of strangeness than the pixels 133 being equal in color strength to the seal members of the vehicle 10.

Incidentally, the colors of the pixel pattern 132 and the background layer 142 may be similar to the colors of the interiors of the vehicle 10 or the color of the window panel (e.g., a green glass). In such a case, the color strength of the background layer 142 is preferred to be equal to the color strength of the interiors of the vehicle 10 or of the window panel. Particularly in the case where the vehicle 10 is designed so that, when viewed from outside the vehicle 10 through the window panel, the seal members are hard to see behind the window panel, it is advisable that the colors of the pixel pattern 132 and the background layer 142 be similar to the color of the interiors, for example, pillar trims (not shown in the drawings) or the like, so that the sense of unity between the exterior members 35 and the window panels will increase.

With regard to the image-printed layer 120, the light condenser portion 121 and the image portion 131 may alternatively be constructed of different base materials 151. In that case, for example, the image portion 131 may be provided by printing the pixel pattern 132 on a vehicle outer-side surface of the base material 151 that constitutes the image portion 131, and a pattern of the background layer 142 may be printed on the vehicle inner-side surface of the base material 151.

Figure 4:
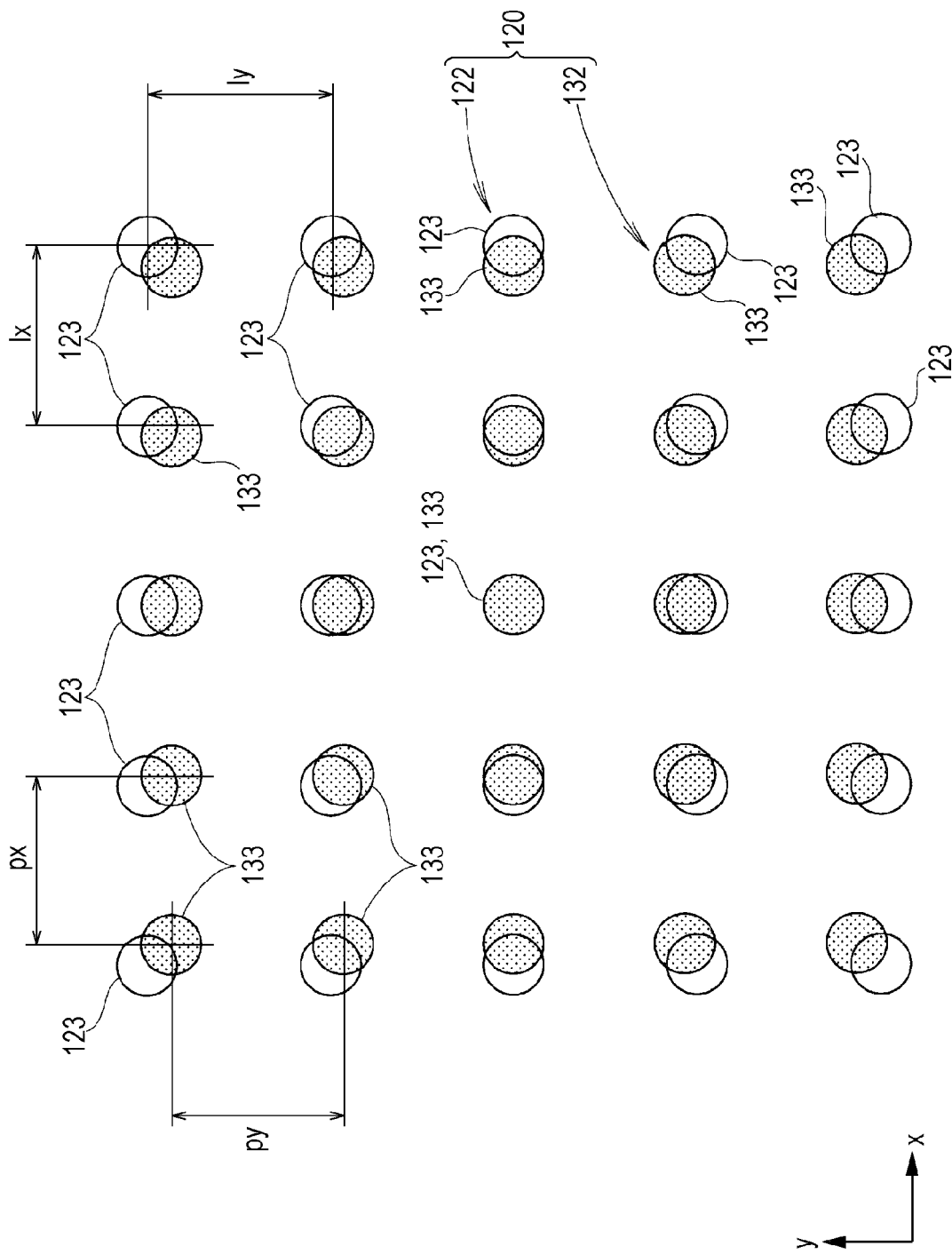
FIG. 4 is an enlarged view of a image-printed layer of the exterior member shown in FIGS. 3A and 3B, which is viewed from outside the vehicle.

FIG. 4 shows a light condenser element pattern 122 in which light condenser elements 123 are two-dimensionally arranged and a pixel pattern 132 in which pixels 133 are two-dimensionally arranged. Note that although FIG. 4 shows the pixels 133 in equal sizes in order to facilitate the illustration of the arrangement relationship between the light condenser element pattern 122 and the pixel pattern 132, a part or the whole of each of the pixels 133 actually appears enlarged by a corresponding one of the light condenser elements 123 when the image-printed layer 120 is viewed from outside the vehicle 10. Furthermore, FIG. 4 does not show the background layer 142, in order to facilitate the illustration of the arrangement relationship between the light condenser element pattern 122 and the pixel pattern 132.

In the example shown in FIG. 4, in the light condenser element pattern 122, a plurality of light condenser elements 123 are two-dimensionally arranged at an arrangement pitch of 1x in an x direction as an example of one arrangement direction and at an arrangement pitch of 1y in a y direction that is perpendicular to the x direction and that is an example of another arrangement direction. Furthermore, in the pixel pattern 132, a plurality of pixels 133 are two-dimensionally arranged at an arrangement pitch of px in the x direction and at an arrangement pitch of py in the y direction. Note that the arrangement pitch herein refers to the distance from a center point of a light condenser element 123 or a pixel 133 to the center point of an adjacent light condenser element 123 or pixel 133 in the one arrangement direction or the another arrangement direction.

When the image-printed layer 120 is viewed from outside the vehicle 10, a virtual image of the pixel pattern 132 formed through the light condenser element pattern 122 appears. At this time, the virtual image of the pixel pattern 132 that the right eye sees through the light condenser element pattern 122 and the virtual image of the pixel pattern 132 that the left eye sees through the light condenser element pattern 122 make a parallax. Due to this parallax, the brain recognizes that the pixel pattern 132 is located nearer or farther in depth than the actual depth at which the pixel pattern 132 is located. Specifically, when the exterior member 35 is viewed from outside the vehicle 10, the virtual image of the pixel pattern 132 appears nearer or farther in depth than the depth at which the pixel pattern 132 is actually located.

When the virtual image of the pixel pattern 132 appears farther sunk in depth than the actual depth at which the pixel pattern 132 is located is when the arrangement pitch of the light condenser element pattern 122 is larger than the arrangement pitch of the pixel pattern 132. For example, in the example of the image-printed layer 120 shown in FIG. 4, the relation of 1x>px and 1y>py holds, so that the virtual image of the pixel pattern 132 appears farther in depth than the actual depth at which the pixel pattern 132 is located. In this case, the smaller the difference between the arrangement pitch of the light condenser element pattern 122 and the arrangement pitch of the pixel pattern 132, the farther sunk in depth the virtual image of the pixel pattern 132 appears. Conversely, the larger the difference between the arrangement pitch of the light condenser element pattern 122 and the arrangement pitch of the pixel pattern 132, the less sunk in depth the virtual image of the pixel pattern 132 appears. Note that when the light condenser element pattern 122 and/or the pixel pattern 132 is printed at a small pitch by using a method such as screen printing, a limit in the production method is sometimes reached. In such a case, the amount of sink of the virtual image of the pixel pattern 132 may be adjusted by changing the distance between the light condenser element pattern 122 and the pixel pattern 132, that is, the thickness of the base material 151. In this case, the greater the thickness of the base material 151, the greater the amount of sink of the virtual image of the pixel pattern 132. When the thickness of the base material 151 is to be changed, it is preferable that the light condenser element pattern 132 be printed so that the focal length of the light condenser element 123 is equal to the thickness of the base material 151.

When the light condenser element pattern 122 and the pixel pattern 132 of the image-printed layer 120 are printed so that the virtual image of the pixel pattern 132 appears sunk in depth, the thickness of the light transmissive layer 110 looks thicker than the actual thickness of the light transmissive layer 110 when the exterior member 35 is seen from outside the vehicle 10. Therefore, particularly when the exterior member 35 is seen from an angle close to the right angle to the surface of the exterior member 35, how the virtual image of the pixel pattern 132 of the exterior member 35 viewed from outside the vehicle 10 looks becomes close to how component parts disposed inside the vehicle 10 look in a view from outside the vehicle 10 through the window panel. As a result, a sense of unity between the window panel and the exterior member 35 is obtained, so that the design characteristics improve. Furthermore, since there is no need to provide a space for obtaining a depth appearance at the reverse side (cabin side) side of the light transmissive layer 110, a reduction of the cabin space and an increase in the feeling of tightness can be prevented and the exterior member 35 can be reduced in weight and production cost.

Although in the example shown in FIG. 4, the x direction as an example of one arrangement direction and the y direction as an example of another arrangement direction are orthogonal, the one arrangement direction and the another arrangement direction do not necessarily need to be orthogonal. Furthermore, for example, one of the arrangement pitch in one direction (e.g., 1x) of the light condenser elements 123 of the light condenser element pattern 122 and the arrangement pitch in another direction (e.g., 1y) of the light condenser elements 123 may be zero. That is, a plurality of semicylindrical light condenser elements 123 may be arranged in the one arrangement direction or the another arrangement direction.

Furthermore, although in the example shown in FIG. 4, the pixels 133 are circular, the pixels 133 do not necessarily need to be circular. For example, pixels 133 having a diagonal shape, such as a triangular shape, a star shape, an elliptical shape, and the like can achieve substantially the same effects. Further, although in the example shown in FIG. 4, the light condenser elements 123 and the pixels 133 are of the same size, the light condenser elements 123 and the pixels 133 do not necessarily need to be equal in size. Furthermore, the pixels 133 do not need to have the same shape. Furthermore, for example, pixels 133 having the same or different shapes may be continually arranged so that a part or the whole of the pixel pattern 132 forms a design.

In the example shown in FIG. 4, 1x and 1y, which are the arrangement pitches of the light condenser elements 123 of the light condenser element pattern 122, and px and py, which are the arrangement pitches of the pixels 133 of the pixel pattern 132, are constant. However, these arrangement pitches do not necessarily need to be constant. For example, the light condenser element pattern 122 and the pixel pattern 132 may be printed in the image-printed layer 120 so that the arrangement pitches of the light condenser elements 123 of the light condenser element pattern 122 and/or the pixels 133 of the pixel pattern 132 vary.

FIGS. 5A and 5B each show an example of an enlarged view of a section of the image-printed layer 120 of the exterior member 35 that is parallel to the x direction. In the examples shown in FIGS. 5A and 5B, light condenser elements 123 are arranged at equal arrangement pitches of 1x in the x direction, and pixels 133 are arranged at various arrangement pitches in the x direction. In a case that the arrangement pitches of the pixels 133 shown in FIGS. 5A and 5B decrease continuously or discontinuously from an x0-side end toward the opposite end in such a manner that 1x>px1>px2>px3>px4>px5> . . . , when the image-printed layer 120 as shown in FIGS. 5A and 5B is viewed from outside the vehicle 10, the depth at which the virtual image of the pixel pattern 132 appears decreases, that is, the depth becomes shallower, continuously or discontinuously from the x0-side end toward the opposite end.

Also, in a case that the arrangement pitches of the pixels 133 shown in FIGS. 5A and 5B become smaller stepwise (e.g., decrease by one step at every three pixels 133) from the x0-side end toward the opposite end in such a manner that 1x>px1=px2=px3>px4=px5= . . . , when the image-printed layer 120 as shown in FIGS. 5A and 5B is viewed from outside the vehicle 10, the depth at which the virtual image of the pixel pattern 132 appears becomes shallower stepwise from the x0-side end toward the opposite end.

Now, in a case that an exterior member 35', which is a comparative example of the exterior member 35, is constructed only of a light transmissive layer 110 located at a vehicle outer side and a background layer 142 printed directly on a rear surface (cabin-side surface) of the light transmissive layer 110, when the exterior member 35' is viewed particularly from an angle other than angles close or equal to the right angle to the vehicle outer-side surface of the exterior member 35', the background layer 142 cannot be visually recognized behind the light transmissive layer 110 but the vehicle outer-side surface of the exterior member 35' looks black. As a result, even when the reflection of an outside scene in the exterior member 35' and the reflection of an outside scene in the adjacent window panel are similar, the exterior member 35' looks conspicuous, so that a sense of unity between the exterior member 35' and the window panel cannot be obtained.

With reference to FIG. 6A, the phenomenon in which the vehicle outer-side surface of the exterior member 35' looks black when the exterior member 35' is viewed particularly from an angle other than angles close or equal to the right angle to the vehicle outer-side surface of the exterior member 35' will be described. As indicated in FIG. 6A, air exists outside the vehicle. Since light travels at a slower speed in the transparent resin that forms the light transmissive layer 110 than in air, the optical refractive index of the transparent resin that forms the light transmissive layer 110 is greater than the optical refractive index of air. As a result, light 161 emitted from the background layer 142 of the exterior member 35' (actually, light reflected from the background layer 142) is refracted at a boundary 165 between the light transmissive layer 110 and the air. In the description below, the air that exists on the vehicle outer side of the exterior member 35' will be referred to as a first medium 162, and the transparent resin that forms the light transmissive layer 110 will be referred to as a second medium 163.

As shown in FIG. 6A, in comparison between the angle (incident angle i1) of the light 161 emitted from the background layer 142 of the exterior member 35' to a normal line 167 and the angle (refraction angle b1) of the light 161 traveling from the boundary 165 between the first medium 162 and the second medium 163 to the outside of the vehicle to the normal line 167, the refraction angle b1 is larger than the incident angle i1. As indicated in FIG. 6A, when the refraction angle b1 is greater than or equal to 90 degrees, the light 161 emitted from the background layer 142 of the exterior member 35' is totally reflected at the boundary 165 between the first medium 162 and the second medium 163, and therefore the light 161 emitted from the background layer 142 of the exterior member 35' does not travel from the boundary 165 between the first medium 162 and the second medium 163 to the outside of the vehicle. The incident angle that gives a refraction angle of 90 degrees is termed the critical angle c.

That is, when the exterior member 35' is viewed particularly from an angle other than angles closer or equal to the right angle to the vehicle outer-side surface of the exterior member 35' such that light from the background layer 142 of the exterior member 35' is incident on the boundary 165 between the first medium 162 and second medium 163 at an incident angle i1 that is greater than or equal to the critical angle c, the light 161 from the background layer 142 of the exterior member 35' is totally reflected at the boundary 165 between the first medium 162 and second medium 163. As a result, the vehicle outer-side surface of the exterior member 35' looks black.

In order to prevent the phenomenon in which the vehicle outside surface of the exterior member 35' looks black when the exterior member 35' is viewed particularly from an angle other than angles close or equal to the right angle to the vehicle outer-side surface of the exterior member 35', it is conceivable to adopt a construction in which a third medium 164 whose optical refractive index is smaller than that of the second medium 162 is provided between the background layer 142 of the exterior member 35' and the second medium 163 as shown in FIG. 6B. An exterior member shown in FIG. 6B is termed the exterior member 35".

As show in FIG. 6B, light 161 from the background layer 142 of the exterior member 35" is refracted at a boundary 166 between the third medium 164 and the second medium 163. In comparison between an incident angle i2 on the boundary 166 between the third medium 164 and the second medium 163 and a refraction angle b2 on the boundary 166 between the third medium 164 and the second medium 163, the refraction angle b2 is smaller than the incident angle i2. As a result, the incident angle i1 on the boundary 165 between the second medium 163 and the first medium 162 is smaller than the incident angle i2 on the boundary 166 between the third medium 164 and second medium 163, so that the refraction angle b1 on the boundary 165 between the second medium 163 and the first medium 162 becomes relatively small. That is, when the angle of the light 161 from the background layer 142 of the exterior member 35' shown in FIG. 6A relative to the background layer 142 and the angle of the light 161 from the background layer 142 of the exterior member 35" shown in FIG. 6B relative to the background layer 142 are equal, the incident angle i1 on the boundary 165 between the first medium 162 and the second medium 163 of the exterior member 35" is smaller than the incident angle i1 on the boundary 165 between the first medium 162 and the second medium 163 of the exterior member 35'.

Therefore, the light 161 from the background layer 142 of the exterior member 35" is prevented from being totally reflected at the boundary 165 between the first medium 162 and the second medium 163, and therefore the vehicle outer-side surface of the exterior member 35" is prevented from looking black.

In the exterior member 35 shown in FIG. 3B, the second medium 163 is the light transmissive layer 110, and the third medium 164 is the base material 151 and the transparent ink or paste that forms the plurality of light condenser elements 123 in the image-printed layer 120. Therefore, the optical refractive indexes of the transparent ink or paste that forms the light condenser elements 123 and of the base material 151 need to be smaller than the optical refractive index of the transparent resin or the like that forms the light transmissive layer 110. Furthermore, the smaller the optical refractive indexes of the transparent ink or paste that forms the light condenser elements 123 and of the base material 151, the more preferable the optical refractive indexes. Since the exterior member 35 includes in the image-printed layer 120 the base material 151 and the light condenser portion 121 that includes the light condenser elements 123, which form the third medium 164, the phenomenon in which the vehicle outer-side surface of the exterior member 35 looks black when the exterior member 35 is viewed particularly from an angle other than angles close or equal to the right angle to the vehicle outer-side surface of the exterior member 35 is prevented. As a result, even when the exterior member 35 is viewed particularly from an angle other than angles close or equal to the right angle to the vehicle outer-side surface of the exterior member 35, a sense of unity between the exterior member 35 and the window panel is obtained, so that design characteristics improve.

Furthermore, as stated above, since the exterior member 35 includes the image-printed layer 120 that causes the virtual image of the pixel pattern 132 to appear sunk in depth, a sense of unity between the exterior member 35 and the window panel is obtained even when the exterior member 35 is viewed particularly from an angle close or equal to the right angle to the vehicle outer-side surface of the exterior member 35. As a result, in comparison with, for example, a structure in which, simply taking into account only the viewing of the exterior member 35 from an angle other than angles close or equal to the right angle, the light condenser portion 121 and the base material 151 of the image-printed layer 120 of the exterior member 35 are simply replaced with an air layer, this exemplary embodiment achieves, while using the same amount of space, a sense of unity between the exterior member 35 and the window panel even when the exterior member 35 is viewed from an angle close or equal to the right angle, so that space efficiency improves. Incidentally, between the light transmissive layer 110 and the base material 151 and the transparent ink or paste that forms the light condenser elements 123 there may be provided, for example, an adhesion layer made of a material whose optical refractive index is smaller than the optical refractive index of the second medium.

Layout Example 1

The vehicle 10, as shown in FIG. 1, the front center garnish 35 is provided in the front door 30 so that, as described above, the front end portion of the front center garnish 35 is adjacent to the rear end portion of the window panel 34. Furthermore, as described above, when the window panel 34 is viewed from outside the vehicle 10, at least a portion of the seal member is visible through the window panel 34. The pixel pattern 132 and the background layer 142 of the image-printed layer 120 of the front center garnish 35 are formed by printing, for example, inks or pastes whose colors are similar to the color of the seal members. However, the ink or past used for the pixel pattern 132 and the ink or paste used for the background layer 142 are preferred to be different in color strength. Furthermore, the color strength of the ink or paste used for the background layer 142 is preferred to be the same as the color strength of the seal members.

Furthermore, the light condenser element pattern 122 and the pixel pattern 132 of the image-printed layer 120 are printed so that when the front center garnish 35 are viewed from outside the vehicle 10, the virtual image of the pixel pattern 132 appears, for example, at substantially the same depth as the depth at which the seal member is actually provided. When a side portion of the vehicle 10 is viewed from outside the vehicle 10, the virtual image of the pixel pattern 132 appears, for example, at substantially the same depth as the depth at which the seal member is provided, so that the sense of unity between the front center garnish 35, which is an exterior member, and the window panel 34 increases.

The pixel pattern 132 of the image-printed layer 120 of the front center garnish 35 may be formed by arranging a series of pixels 133 that exhibit straight or curved lines extending in the front-rear direction so that the whole of the pixel pattern 132 forms a stripe pattern. In the case where the whole of the pixel pattern 132 forms a stripe pattern, flow of light is less likely to be inhibited when the sight line along which the front center garnish 35 is seen from outside the vehicle 10 is nearly parallel to the surface of the front center garnish 35, in comparison with the case where the pixels 133 of the pixel pattern 132 have the shape of a graphic such as a circle. As a result, the reflection of an outside scene in the light transmissive layer 110 of the front center garnish 35 is easy to see.

Furthermore, Layout Example 1 is applicable to not only the front center garnish 35 but also garnishes provided at other locations, such as the rear center garnish 45. Still further, for example, in the case where the front center garnish 35 and the rear center garnish 45 are disposed between the window panel 34 and the window panel 44, the depth at which the virtual images of the pixel patterns 132 of the two garnishes 35 and 45 appear between the window panel 34 and the window panel 44 when the front center garnish 35 and the rear center garnish 45 are viewed from outside the vehicle 10 may be substantially constant and substantially the same as the depth at which the seal members are provided. When a side portion of the vehicle 10 is viewed from outside the vehicle 10, the front center garnish 35 and the rear center garnish 45 are not conspicuous and an area that includes the window panel 34 and the window panel 44 looks as if the area were formed by a single window panel, so that the sense of unity between the window panel 34, the front center garnish 35, the rear center garnish 45, and the window panel 44 increases.

Layout Example 2

In the vehicle 10, as shown in FIG. 1, the left front garnish 53 is provided as described above so that the right end portion of the left front garnish 53 is adjacent to the left end portion of the front window panel 52 and so that the end portion of the left front garnish 54 other than the right end portion thereof is adjacent to the external surface of a front-side portion of the vehicle body 20. In this example, the image-printed layer 120 is printed, for example, so that when the left front garnish 53 is viewed from outside the vehicle 10, the depth at which the virtual image of the pixel pattern 132 appears becomes shallower from an end thereof adjacent to the front window panel 52 toward the opposite end. The colors of the pixel pattern 132 and the background layer 142 of the image-printed layer 120 of the left front garnish 53 may be, for example, substantially the same as the colors of the background layer 142 and the pixel pattern 132 of the image-printed layer 120 of the front center garnish 35 described above.

Therefore, when the left front garnish 53 is viewed from outside the vehicle 10, the depth at which the virtual image of the pixel pattern 132 becomes shallower from an end portion thereof adjacent to the front window panel 52 toward the opposite end, so that the left front garnish 53 and the front window panel 52 look as if they were a single window panel. As a result, the sense of unity between the left front garnish 53, the front window panel 52, and the external surface of a front-side portion of the vehicle body 20 increases. This Layout Example 2 is applicable to not only the left front garnish 53 but also garnishes provided at other locations, such as the right front garnish, the upper front garnish 54, left and right headlight garnishes, and left and right rear light garnishes.

Modifications

A modification in the present disclosure described below is different from the vehicle 10 shown in FIG. 2 only in a structure that includes a center pillar 23 and its surroundings. Therefore, in conjunction with this modification, descriptions of matters that correspond to those shown in FIG. 1, FIG. 3A to FIG. 5B will be omitted below. Furthermore, Layout Example 1 and Layout Example 2 described above may be applied to the modification in similar manners.

FIG. 7 illustrates relations between a front door 30 and a rear door 40 that are closed and a center pillar 23. In the example shown in FIG. 7, a center pillar protrusion 23*b* is provided on a left side of the center pillar 23. A through hole 68 is formed substantially at a center of a left side of the center pillar protrusion 23*b*. A distal end 69*a* of a seal presser portion 69 is protruded inside the through hole 68. The distal end 69*a* of the seal presser portion 69 also penetrates a weather strip 71, so that the weather strip 71 is clamped and fixed between the center pillar protrusion 23*b* and the seal presser portion 69. The weather strip 71 seals a gap between the center pillar 23 and a window panel 34 and a gap between the center pillar 23 and a window panel 44. In the description of this exemplary embodiment below, the weather strip 71 is also termed the seal member. When the window panel 34 is viewed from outside the vehicle 10, at least a portion of the seal member is visible behind the window panel 34.

In the example shown in FIG. 7, the vehicle 10 includes on a left side of the seal presser portion 69, that is, a vehicle outer-side thereof, a center garnish 72 as an exterior member that conceals an outer surface of the seal presser portion 69 in the vehicle transverse direction. In the example shown in FIG. 7, it is preferable that the center garnish 72 be made of a soft material and be stuck to the seal presser portion 69. Therefore, the center garnish 72 is provided between the front door window panel 34 and the rear door window panel 44. The construction of the center garnish 72 is substantially the same as the construction of the foregoing front center garnish 35 (exterior member 35) described above.

The present disclosure is not limited to the foregoing exemplary embodiments, and a person skilled in the art should be able to easily change the foregoing exemplary embodiments within a range defined by the disclosure.

What is claimed is:

1. A vehicle comprising:
    a vehicle body having an external surface and an interior space therein;
    a transparent panel having an outside surface extending along the external surface of the vehicle body and an inside surface that is facing the interior space in the vehicle body; and
    an exterior member having at least one side end that is adjacent to the transparent panel and an outside surface that extends along the external surface of the vehicle body so as to constitute substantially one portion of a vehicle exterior surface along with the transparent panel,
    the exterior member comprising:
    a light transmissive layer located at a vehicle external surface side of the exterior member; and
    an image-printed layer that is located at a vehicle inner side of the light transmissive layer and that is in contact with the light transmissive layer,
    the image-printed layer comprising:
        a printed image layer that is formed of a pixel pattern in which a plurality of pixels are two-dimensionally arranged; and
        a light condenser layer that is light transmissive, that is located between the light transmissive layer and the printed image layer and that is formed of a light condenser element pattern in which a plurality of light condenser elements are two-dimensionally arranged, wherein
    the pixel pattern of the printed image layer and the light condenser element pattern of the light condenser layer are printed in such a formation that, when the exterior member is viewed from outside the vehicle, a virtual image of the pixel pattern appears on an inner side than an actual location of the pixel pattern of the printed image layer.

2. The vehicle according to claim 1, wherein the transparent panel is a transparent window panel that covers a transparent window opening of the vehicle.

3. The vehicle according to claim 2, further comprising a seal member that seals between the exterior member and an edge of the transparent window panel which is adjacent to the exterior member, wherein
    a color of the pixel pattern is similar to a color of the seal member.

4. The vehicle according to claim 3, wherein the pixel pattern of the printed image layer and the light condenser element pattern of the light condenser layer are printed such that a depth of the virtual image from the outside surface of the exterior member is substantially the same as a depth of a location of the seal member form an outside surface of the transparent window panel.

5. The vehicle according to claim 2, further comprising a front door and a rear door each of which closes and opens a door opening provided in a side surface of the vehicle body, wherein:
    each of the front door and the rear door is provided with the window opening and a window panel that is the transparent panel covering the window opening; and
    the exterior member is disposed between the window panel of the front door and the window panel of the rear door.

6. The vehicle according to claim 5, wherein the virtual image appears substantially in a constant depth from the outside surface of the exterior member.

7. The vehicle according to claim 1, wherein:
    the exterior member has a first side end adjacent to the transparent panel and a second, opposite side end; and
    the pixel pattern of the printed image layer and the light condenser element pattern of the light condenser layer are printed such that, when the exterior member is viewed from outside the vehicle, the virtual image from the outside surface of the exterior member appears in a depth that becomes shallower from the first side end toward the second side end.

8. The vehicle according to claim 1, wherein a pitch between the plurality of light condenser elements is larger than a pitch between the plurality of pixels in the pixel pattern.

9. An exterior member for a vehicle comprising:
    at least one side end that is adjacent to a transparent panel provided to a vehicle body, the transparent panel having an outside surface extending along an external surface of the vehicle body and an inside surface that is facing an interior space in the vehicle body;

an outside surface that extends along the external surface of the vehicle body so as to constitute substantially one portion of a vehicle exterior surface along with the transparent panel;
a light transmissive layer located at a vehicle external surface side of the exterior member; and
an image-printed layer that is located at a vehicle inner side of the light transmissive layer and that is in contact with the light transmissive layer, the image-printed layer comprising:
a printed image layer that is formed of a pixel pattern in which a plurality of pixels are two-dimensionally arranged; and
a light condenser layer that is light transmissive, that is located between the light transmissive layer and the printed image layer and that is formed of a light condenser element pattern in which a plurality of light condenser elements are two-dimensionally arranged, wherein
the pixel pattern of the printed image layer and the light condenser element pattern of the light condenser layer are printed in such a formation that, when the exterior member is viewed from outside the vehicle, a virtual image of the pixel pattern appears on an inner side than an actual location of the pixel pattern of the printed image layer.

* * * * *